United States Patent [19]

Jourdan et al.

[11]  4,411,521
[45]  Oct. 25, 1983

[54] OPTOELECTRIC DETECTION DEVICE ESPECIALLY FOR LASER RADIATION

[75] Inventors: Francis Jourdan; Patrice Marquet; Francois Ternant, all of Paris, France

[73] Assignee: Thomson-CSF, Paris, France

[21] Appl. No.: 156,087

[22] Filed: Jun. 3, 1980

[30] Foreign Application Priority Data

Jun. 8, 1979 [FR] France ............................... 79 14718

[51] Int. Cl.³ ............................................. G06J 1/42
[52] U.S. Cl. .................................... 356/225; 250/216
[58] Field of Search ............................... 356/218–228, 356/416; 250/216; 350/17, 431

[56] References Cited

U.S. PATENT DOCUMENTS

| 2,836,098 | 5/1958 | Stimson et al. | 356/221 X |
|---|---|---|---|
| 3,091,162 | 5/1963 | Stimson | 354/23 R |
| 3,205,796 | 9/1965 | Lieser | 356/226 |
| 3,226,557 | 12/1965 | Goodman | 250/216 |
| 3,761,184 | 9/1973 | McLaughlin, Jr. | 356/416 |
| 3,954,340 | 5/1976 | Blomquist et al. | 356/152 |
| 3,977,628 | 8/1976 | Barron | 244/316 |
| 4,015,120 | 3/1977 | Cole | 250/216 |
| 4,093,384 | 6/1978 | Ferguson | 356/416 |
| 4,153,368 | 5/1979 | Falbel et al. | 356/225 |

FOREIGN PATENT DOCUMENTS

| 1240295 | 1/1965 | Fed. Rep. of Germany . |
| 1382253 | 11/1964 | France . |
| 1193567 | 6/1970 | United Kingdom . |
| 1497411 | 1/1978 | United Kingdom . |

Primary Examiner—Bruce Y. Arnold
Attorney, Agent, or Firm—Cushman, Darby & Cushman

[57] ABSTRACT

A device for radiation detection over a broad field, especially for laser radiation detection. The device comprises a photodetector associated with an optical receiver formed by two diaphragms which delimit the field, and an optical diffusing element. In a preferred embodiment, a diffusing paint is deposited on a flat surface of a mechanical part, and a mirror for reflecting the diffused radiation makes it possible to mount at the rear end of the device either the photodetector or an optical fiber terminal to which the photodetector is remotely coupled.

6 Claims, 15 Drawing Figures

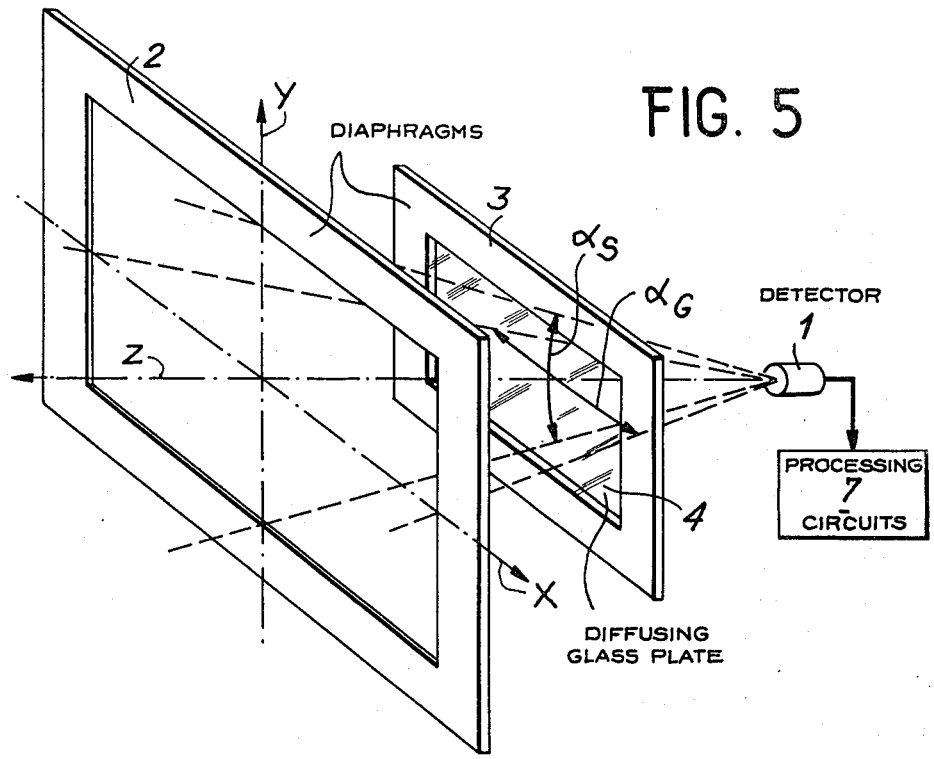
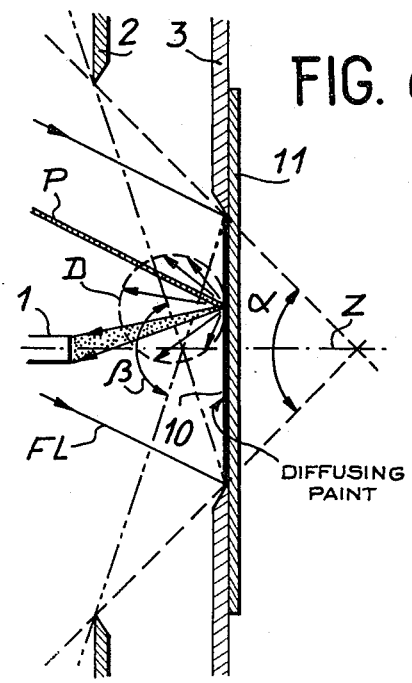
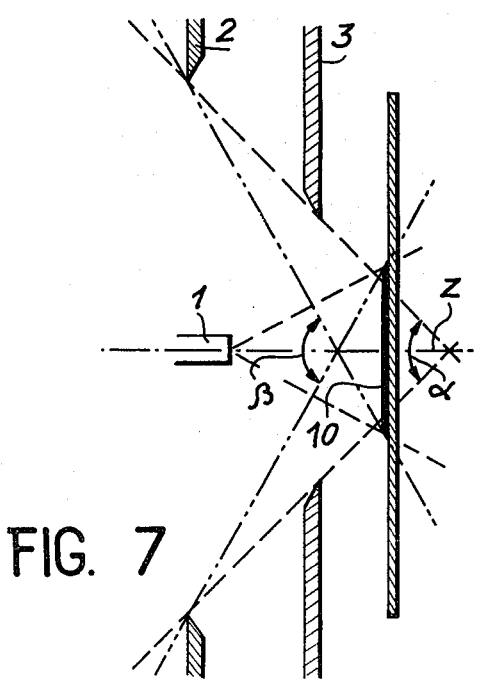

OPTOELECTRIC DETECTION DEVICE ESPECIALLY FOR LASER RADIATION

This invention relates to an optoelectric detection device which is more particularly intended for the detection of laser radiation.

Laser illuminators are coming into increasingly widespread use in the equipment of weapons systems, especially in fire-control laser telemetry, weapon guidance by laser illumination, designation of targets by laser tracking. All ground vehicles, whether armored or not, are among the most vulnerable to attack by means of the above-mentioned types of weapons and it is therefore essential to ensure that they are protected by a laser detection system in order to adopt countermeasures. It should be noted that laser detection can be utilized for the purpose of identifying friendly illumination within the scope of a friend-foe identification system and can be provided in conjunction with the previous application or conversely.

Whatever application may be contemplated for detection of laser radiation (whether such radiation is expected or not), the detection device installed on board vehicles must be capable of omnidirectional surveillance in azimuth over the entire panoramic field of 360 degrees and several tens of degrees in elevation. A further requirement is that the space under observation must be continuously covered. A rotating optical head or scanning device is ill-suited to this function since it would not permit reliable detection of a short-pulse laser illuminator such as a YAG laser.

In order to avoid the need for an excessive number of detecting devices or so-called sensors, it is clearly of primary importance to ensure that each sensor has a sufficiently broad field of reception corresponding, for example, to a range of several tens of degrees both in azimuth and in elevation. A certain number of sensors must nevertheless be placed at different locations on the vehicle in order to obtain overall panoramic coverage while taking into account the small angle of divergence of the laser beam. In consequence, the field criterion has to be completed by properties which are standard requirements for military equipment, namely compactness, simplicity of design and ease of installation, rugged construction and low cost.

One aim of the invention is to provide a laser detector which satisfies these requirements for installation on land vehicles or other types of vehicles.

A radiation detection device usually comprises a photoelectric detector associated with an optical system for receiving radiation emanating from the field observed by the detection assembly. Within the limits of a simple constructional design, the optical system xconsists of a single lens constituting a dioptric element for focusing the radiation on the photosensitive detector surface which is located in the corresponding focal plane. This simple solution suffers from two major drawbacks. On the one hand, if the illumination to which the lens is subjected becomes suddenly intense (which is usually the case when receiving laser illuminator pulses), the luminous flux is concentrated by the focusing process, with the result that there is a potential danger of damage to, and even destruction of, the photodetector which may consist of a simple photoreceiver diode. Furthermore, the search for a low-cost solution necessarily entails the use of small-size photodetectors; and since the diameter of the desired pupil is distinctly larger, the focal length of the lens remains much longer than the diameter of the photosensitive surface; this results in a fairly limited field of reception.

In order to remove these two disadvantages, one solution consists in defocusing the detector by bringing it closer to the lens. In this concept, the field can be substantially increased but other drawbacks then arise. Only a fraction of the incident beam reaches the detector and the useful area of the entrance pupil rapidly becomes very small. Furthermore, should the corresponding useful zone of the lens be occulted or masked by a mud spot, for example, detection would take place only in respect of angles of incidence within the corresponding solid angle of occultation of the detector. As a result, reliability of the device may be considerably impaired.

In order to find an answer to the problem thus set, there remain two alternatives; the first is to adopt a more complex optical system, which is contrary to the criterion of compactness, of mechanical strength and especially of cost; the second alternative, which is the solution adopted in the present invention, consists in having recourse to an optical receiver which is designed on a distinctly different conceptual basis.

In accordance with a characteristic feature of this invention, provision is made for a laser detector device in which the optical receiver combined with a photosensitive detector comprises a set of diaphragms for delimiting the field and a device for diffusing the radiation received at each point thereof so that a nonzero fraction of the light energy transported by each incident ray is diffused in the direction of the detector.

Other features of the invention will be more apparent to those skilled in the art upon a consideration of the following description and accompanying drawings, wherein:

FIG. 5 is a diagram relating to an embodiment which provides a reception field of rectangular cross-section;

FIGS. 6 and 7 are simplified diagrams of a preferred solution for a detection device according to the invention;

Figure 1:
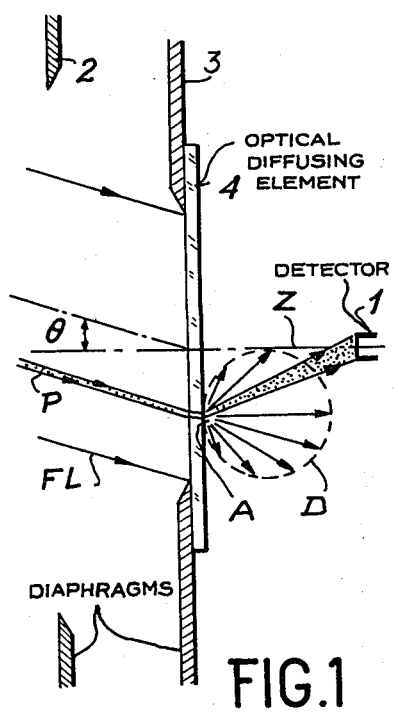
FIGS. 1, 2 and 3 are simplified diagrams of a detection device according to the invention.

Referring now to FIG. 1, the device comprises the detector 1 proper and the optical portion or so-called optical receiver formed by two diaphragms 2 and 3 and by an optical diffusing device 4. The optoelectric detector 1 can be remotely located and replaced by the attachment terminal of an optical fiber connector, the other end of the optical fiber being in that case located in the proximity of the detector. Each light pencil P of a received beam FL having an angle of incidence $\theta$ as shown will be distributed in a predetermined diffusion diagram D. In this first embodiment, the optical diffusing device 4 is a plate of ground glass or opal glass. It can be postulated as a first approximation that the glass plate 4 behaves at each point A of its ground-glass face (namely that face which is oriented towards the detector) in the same manner as a Lambertian source and has a substantially circular diffusion diagram. Thus, from each illuminated point A of the ground-glass face, a fraction of the light received in the form of the corresponding pencil beam P is transmitted by diffusion towards the receiving surface of the element 1 (optoelectric detection or optical fiber detection). This fraction is shown in the schematic presentation of FIG. 1.

The optical pupil provided by the device is defined by the diaphragm 3. In the embodiment shown in FIGS. 1 and 2, the diaphragm 3 is in contact with the plate 4 and the pupil is constituted by that zone of the plate which is left uncovered, namely a circle of diameter D1 in the case of a circular construction about an optical axis Z on which the detector 1 is aligned.

The set of two diaphragms delimits the field; $\alpha$ represents the full-light field and $\beta$ represents the total field. The value $\alpha$ is given by $tg(\alpha/2)=(D2-D1)/2d$ where D2 is the diameter of the diaphragm 2 and d is the distance between the diaphragms; similarly, the value $\beta$ is given by $tg(\beta/2)=(D1=D2)/2d$. As long as the value of the angle of incidence $\theta$ remains lower than $\alpha/2$, the field diaphragm 2 does not play any part since only the so-called aperture diaphragm 3 or pupil diaphragm limits the illuminated surface of the glass plate 4. Vignetting takes place in respect of any angle of incidence within the range of $\alpha/2$ to $\beta/2$; in other words, a fraction of the zone of diameter D1 is illuminated; this function progressively decreases towards the value $\beta/2$ and becomes zero at this value and beyond.

Figure 3:
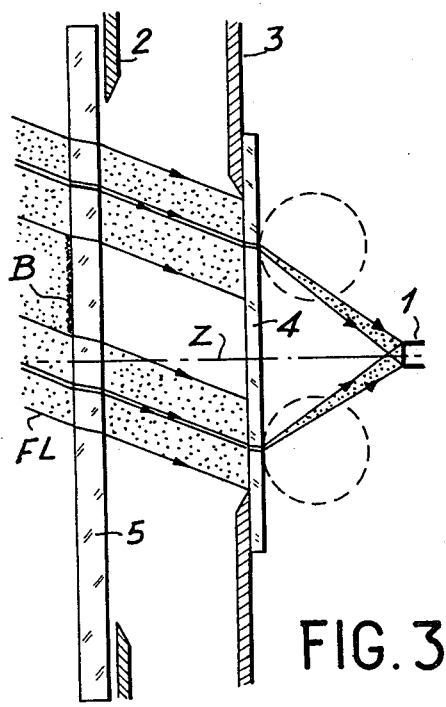

In FIG. 3, the deposit B represents for example a mud spot on a window 5 which protects the optical system from the exterior. The spot B intercepts part of the beam FL to be detected and casts a shadow on the ground-glass plate 4. As can be understood, the entire remaining surface of the plate which is illuminated transmits a fraction of the light received to the detector 1. The presence of the spot undoubtedly results in a loss of sensitivity but does not "blind" the optical system as could be the case in a design consisting of a dioptric element and defocused detector mentioned earlier.

Figure 4:
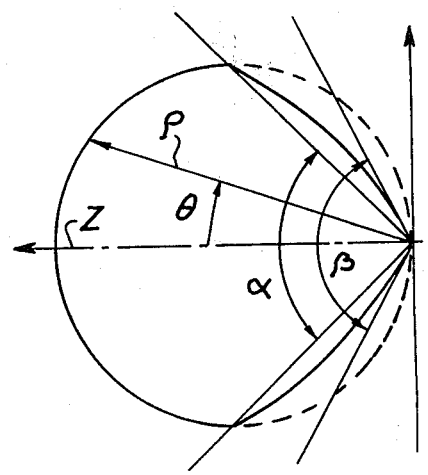
FIG. 4 shows the reception pattern of the device according to FIGS. 1, 2 or 3.

FIG. 4 illustrates the receiving pattern of the optical system. In the case of angles of incidence $\theta$ which are smaller than $\alpha/2$, the pattern complies with the law $\rho=K \cos \theta$ and is circular. In the case of $\alpha/2<\theta<\beta/2$, the variation is more complex since it is dependent on a greater number of parameters involving in particular the shape of the diaphragms (parameters D1 and D2) and the distance between them (parameter d). In the case of the optical system which has just been described, the full-lighted field can be very substantial and can attain 90°, for example, without any difficulty, thus providing an effective solution to the problem.

As shown in FIG. 5, the optical receiver proves highly versatile. Coverage of a field which is not circular but of rectangular or square section is readily obtained by means of diaphragms of suitable shape. Thus the diaphragms of rectangular shape shown in the figure determine the different field angles $\alpha_S$ in elevation and $\alpha_G$ in azimuth.

Figure 2:
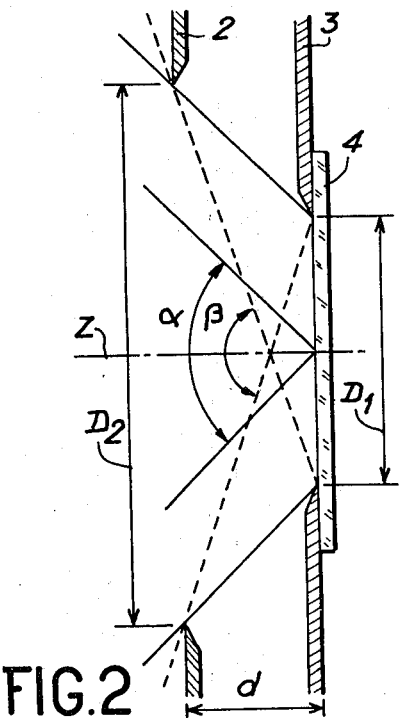

FIG. 6 shows an improved optical receiver in which the optical diffusing element is constructed differently, the plate of ground glass being replaced by a coat or layer of diffusing paint 10 deposited on a mechanical support 11. The layer 10 is placed on the side nearest the incident radiation and the detector 1 is placed in oppositely-facing relation on the same side. The coat of paint 10 behaves substantially in the same manner as a Lambertian source and, in this concept, each light pencil P is diffused by reflection and not by transmission. This mode of construction of the diffuser is preferred since it offers undeniable advantages. In the first place, the device is compact since the photodetector 1 and the diaphragms 2-3 are located on the same side as the diffusing plate 10-11 instead of being on each side of a ground-plate 4 (as shown in FIGS. 2, 3 and 4). In the second place, the coefficient of transmission of ground-glass or opal glasses which can be employed for the preceding optical system can hardly be better than about 10%, whereas the coefficient of reflection of diffusing paints can attain 70%. The last-mentioned solution thus offers a much higher degree of sensitivity. The corresponding gain makes it possible in particular to compensate for the insertion and transmission losses of a fiber element which serves to connect the optical system to a remote detector.

Whichever design solution may be adopted, the diffusing element is preferably constructed in a flat shape, taking into account the non-directivity of the diagram at each point and of the greater simplicity of construction.

Figure 8:
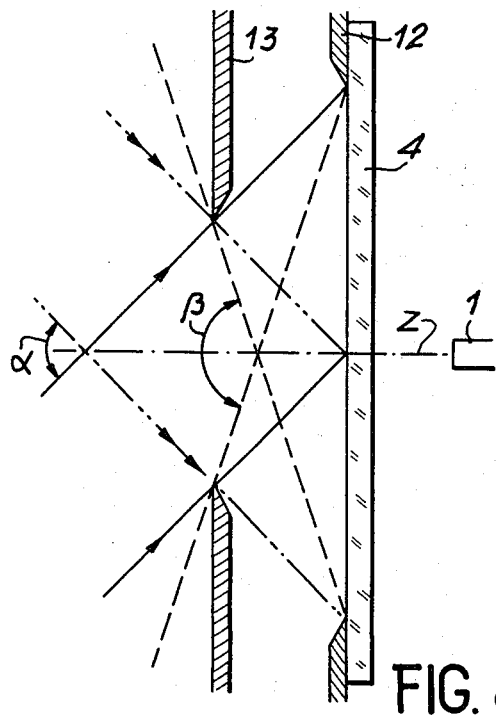
FIG. 8 is a diagram relating to an alternative mode of assembly.

FIG. 7 illustrates another possible arrangement in which the diffusing element is positioned at a distance from the diaphragm 3 and is no longer placed against this latter. The area of the diffusing layer 10 is limited at least to the useful zone determined by the full-light field $\alpha$. It is also possible to reverse the roles of the two diaphragms as shown in FIG. 8 in which the diaphragms 12 and 13 perform respectively the functions of the preceding diaphragms 2 and 3. The diaphragms can be formed by sharp edges of mechanical parts which are incorporated in the structure of the detection device.

Figure 9:
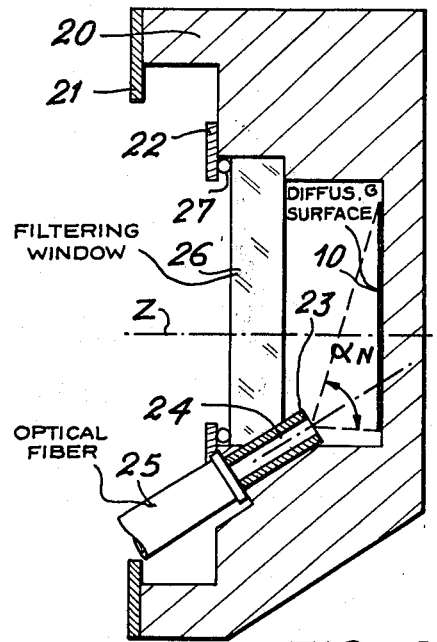
FIG. 9 is a diagram of one example of construction of the device according to FIG. 6 or FIG. 7.

FIG. 9 shows a first possible mode of construction of the diffusing-paint solution. A mechanical component or block 20 serves to support the complete assembly and has a flat surface on which a coat of diffusing paint is deposited. Parts 21, 22 which are rigidly fixed to the block 20 form the diaphragms. Reception of the light radiation diffused by reflection takes place at the end of the connector terminal of an optical-fiber conductor. There is shown in the figure the terminal 23 which surrounds a fiber or fiber bundle 24, the sheathed optical cable 25 being coupled at the other end (not shown) to a photodetector such as a PN or PIN diode, for example, for detection in the 1.06 $\mu$m band. A window 26 and a seal 27 complete the assembly in order to protect the device. The window also serves as a filter for eliminating the non-useful spectrum. For example, for detection in the 1.06 $\mu$m band mentioned above, the window can be of RG 850 glass which eliminates all radiations having wavelengths shorter than 0.85 $\mu$m. The inclined arrangement of the end portion of the optical conductor 24 with respect to the surface 10 permits on the one hand an appreciable reduction of the occultation relative to an axial position of said conductor along the axis Z and on the other hand a reduction in the numerical aperture value $\alpha_n$ which is necessary in order to cover the entire useful diffusion surface; the feature just mentioned makes it possible to employ optical fibers which are lower in cost.

Figure 10:
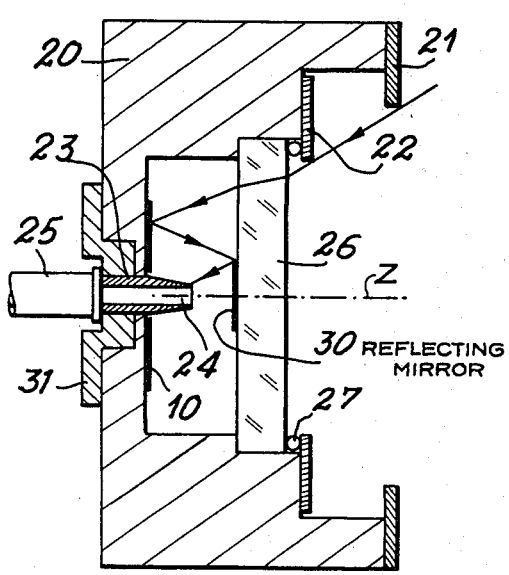
FIG. 10 is a diagram of a preferred embodiment of the device according to FIG. 6 or FIG. 7.

FIG. 10 illustrates the preferred embodiment of a detector device according to the invention. In order to provide a remedy for the inconvenient arrangement of the optical conductor in the previous embodiment since it projects from the front end of the device, a reflecting mirror 30 is introduced on the optical path between the diffusing surface 10 and the end portion of the fiber 24 (or of a photodetector). The mirror 30 is advantageously formed by means of a partial deposit on that face of the filtering window 26 which is located opposite to the layer 10. In this arrangement, the connector terminal 23 is again located at the rear for receiving the light rays reflected from the mirror; said terminal can readily be placed axially and maintained in the support block 20 by means of a ferrule 31. The optical conductor emerges from the rear end of the device, thus providing greater flexibility of use.

Figure 11:
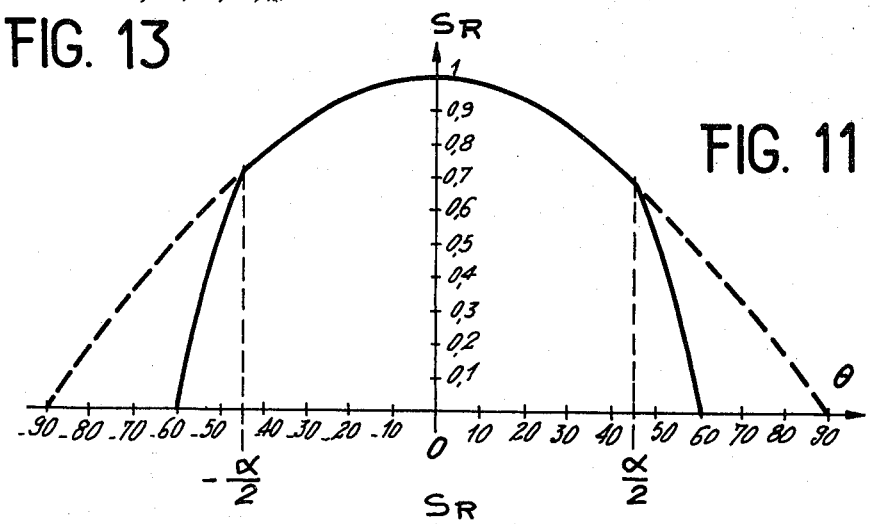
FIG. 11 shows a curve of variation in sensitivity as a function of the angle of incidence in respect of a detector device according to any one of FIGS. 1, 2, 3, 5, 6, 7, 8 or 9.

The sensitivity of the detector devices corresponding to FIGS. 1 to 9 is proportional to the cosine of the angle of incidence $\theta$ of the laser beam with respect to the axis of the system, in the case of values of $\theta$ below $\alpha/2$. This is explained by the fact that the behavior of the diffusing elements contemplated (opal glass or paint) is very close to that of a perfect diffusing surface or Lambertian diffuser. FIG. 11 represents the course of the characteristic curve of sensitivity of optoelectric detection devices of this type as a function of the angle of incidence $\theta$, such devices being so designed as to have a full-light field $\alpha$ equal to 90°. This sensitivity is expressed in relative values with respect to the maximum sensitivity obtained in the axis of the system. The curve of FIG. 11 is in fact only the representation in cartesian coordinates, of the curve shown in FIG. 4 and expressed in polar coordinates. It is apparent that, in the case of large angles of incidence in which $\theta$ is close to the extreme or limiting values $\pm \alpha/2 = \pm 45°$ of the full-light field, the sensitivity already exhibits an appreciable drop of the order of 30% with respect to the axial direction ($\theta = 0$) and, in the case of higher values of $\theta$, the drop is even more rapid. This final form of variation is advantageous since the net radiation of the lobes at $\pm 45°$ permits easier discrimination of directions in a formula comprising a plurality of detector devices and facilitates their installation on the vehicle. On the other hand, within the useful range corresponding to the field of $-\alpha/2$ to $+\alpha/2$, it is preferably to ensure that the optical receiver exhibits practically uniform sensitivity.

Figure 12:
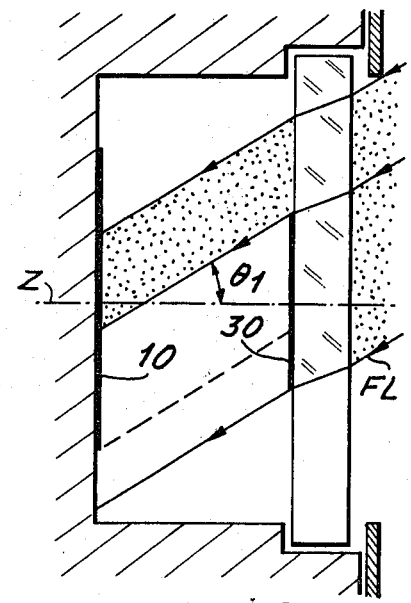
FIGS. 12, 13 and 14 are diagrams relating to the operation of a detector device according to FIG. 10.
Figure 13:
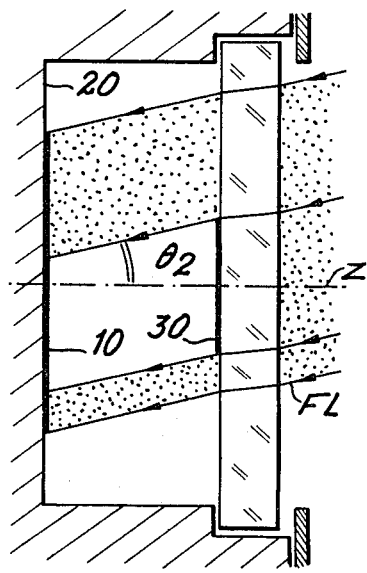
Figure 14:
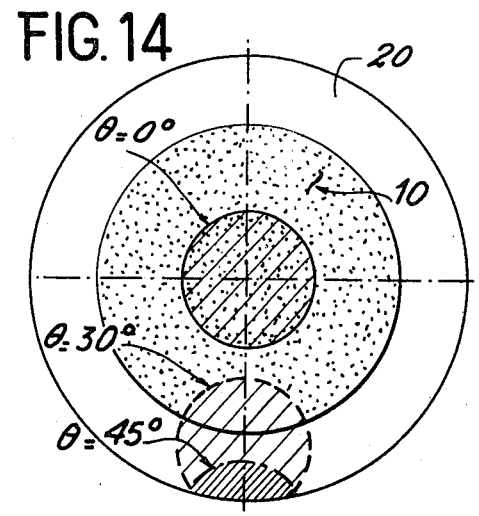
Figure 15:
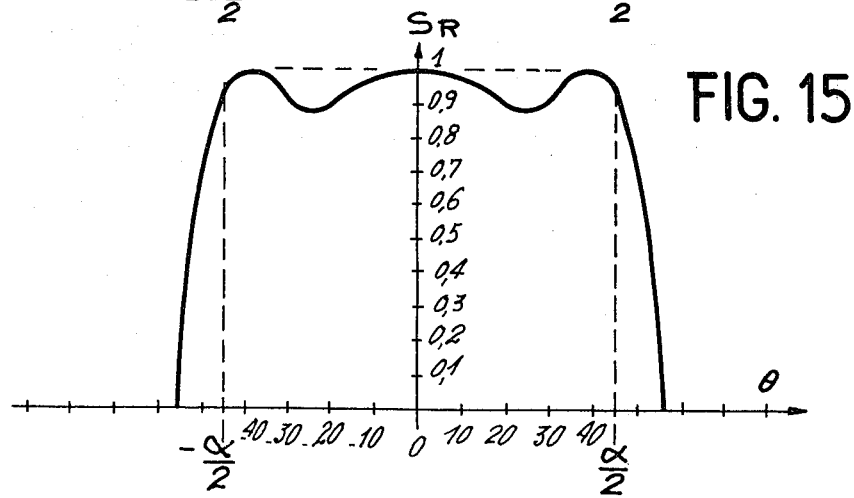
FIG. 15 shows a curve of variation in sensitivity as a function of the angle of incidence in respect of a detector device according to FIG. 10.

A further advantage obtained by means of the preferred solution shown in FIG. 10 lies in the correction which is accordingly made in the curve of sensitivity by virtue of the occultation introduced by the mirror 30. As shown in FIGS. 12, 13, 14 in which certain elements have been omitted for the sake of simplification, the mirror 30 produces a central occultation of the incident radiation FL. The corresponding shadow cast on the plane of the diffusing surface 10 is located either entirely within the zone covered by the paint layer 10 (as shown in FIG. 13) or only to a partial extent (FIG. 12), depending on the value of the angle of incidence $\theta$. In the case of fairly low values of the angle $\theta$ to 0 to approximately $\pm 30°$ in this example, the cast shadow is total within the area 10 (as shown in FIG. 14) but is only partial thereafter, thus increasing the sensitivity of the device. In fact, the increase in sensitivity also arises from the fact that the central portion of the area 10 which is occulted at low values of the angle of incidence is illuminated to a progressively greater extent when the angle of incidence increases. It is indeed in the central portion that the contribution to sensitivity is the greatest by reason of the axial position of the elements of the combination, especially of the connector terminal for the optical receiving fiber or the photodetector. FIG. 15 represents the corresponding response curve.

The mirror design, which is a preferred form of construction, also offers good characteristics of compactness, especially by virtue of the fact that reflections permit folding-back of the optical path. The optical pupil is constituted by the useful diffusing surface for light rays received by the photodetector or the optical conductor via reflection from the mirror.

It is worthy of note that the position location of a photodetector on the optical axis constituted by the axis of symmetry of the assembly is not critical as long as this element is neither too near nor too far from the diffusing element. As the photodetector is brought nearer, so the active portion of the diffusing element (that is, the portion which produces an appreciable reflection of light energy towards the detector) becomes progressively smaller; and as the photodetector is placed further away from the diffusing element, so the collected light energy as well as the sensitivity are progressively reduced. In the case of optical fibers, the optimum position location is readily determined by taking into account the numerical aperture characteristics of the fibers.

The optoelectric detection devices described in the foregoing can serve to detect any radiation of sufficient level without any need for image formation. If necessary, they can serve to constitute an apparatus for the measurement of light intensity. The application for which these devices are primarily intended, however, is the construction of a device for laser countermeasures or an IFF (identification friend or foe) laser transponder. Processing circuits and other corresponding means fed by the detector are represented schematically by the block 7 in FIG. 5, on the assumption that they are constructed in accordance with known techniques.

Consideration can also be given to many alternative forms corresponding to the characteristics of the present invention. By way of example, a plurality of detector elements which are sensitive to different wavelength ranges can replace a single element 1; the plurality of detectors can be placed at a remote location and connected by means of one or a number of fibers and optical couplers to a single end portion or terminal 24, and so on.

What is claimed is:

1. An optoelectric incident radiation detection device applicable in particular to detecting a beam of incident laser radiation comprising:
   optical means for receiving the incident radiation from the observed field which observed field is centered on the optical axis of said optical means; and
   photodetection means comprising at last one photodetector element having a receiving surface for detecting the radiation transmitted via said optical means for receiving to said receiving surface;
   said optical means for receiving being formed by a set of two diaphragms for delimiting said field of observation and by means for diffusing the radiation passed by said two diaphragms and incident on said means for diffusing so that a fraction of the light energy transported by any beam of radiation incident on said means for diffusing is directed to the receiving surface of said photodetection means, said means for diffusing being constituted by a diffusing paint applied on a surface of mechanical part, the diaphragms and the receiving surface of the photodetection means being located on the same side of the diffusing means.

2. A device according to claim 1, wherein the means for diffusing has a flat shape and is centered on the optical axis.

3. A device according to claim 2, wherein the optical means for receiving further comprises a reflecting mirror for reflecting the radiation, diffused by the paint, in the direction of the receiving surface, and wherein said receiving surface is located opposite to said mirror.

4. A device according to claim 3, wherein said reflecting mirror is centered on the optical axis and disposed on a flat face of a protective window of transparent material, said protective window including optical filtering means for selectively passing particular wavelengths of radiation.

5. A device according to any one of claims 1 to 4, wherein said photodetection means are remotely located from said means for diffusing by interposition of an optical-fiber conductor which has a first end surface for the reception of light radiation diffused by said means for diffusing and a second end surface coupled to said receiving surface.

6. A device according to claim 5, wherein said first end surface is positioned off-center with respect to said optical axis.

* * * * *